(12) United States Patent
Walster et al.

(10) Patent No.: US 7,062,524 B2
(45) Date of Patent: *Jun. 13, 2006

(54) METHOD AND APPARATUS FOR SOLVING AN INEQUALITY CONSTRAINED GLOBAL OPTIMIZATION PROBLEM

(75) Inventors: G. William Walster, Cupertino, CA (US); Eldon R. Hansen, Los Altos, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 745 days.

This patent is subject to a terminal disclaimer.

(21) Appl. No.: 10/042,883

(22) Filed: Jan. 8, 2002

(65) Prior Publication Data

US 2003/0131033 A1    Jul. 10, 2003

(51) Int. Cl.
G06F 7/38    (2006.01)
G06F 7/00    (2006.01)
(52) U.S. Cl. ...................................... 708/446; 708/200
(58) Field of Classification Search .............. 708/446, 708/200
See application file for complete search history.

(56) References Cited

U.S. PATENT DOCUMENTS

2002/0183987 A1 * 12/2002 Chiang ........................... 703/2

OTHER PUBLICATIONS

Paul Snow, The posterior probabilities of linearly constrained priors and interval-bounded conditionals, Sep. 1996, IEEE transactions on systems, man, and cybernetics-part a: systems and humans, vol. 26, No. 5, pp. 655-659.*

E.R. Hansen, "Global Optimization Using Interval Analysis," Marcel Dekker, Inc., New York, NY, 1992.

R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar. 1995, pp. 63-78 http://interval.louisiana.edu/preprints.html.

(Continued)

Primary Examiner—Kakali Chaki
Assistant Examiner—Chat C. Do
(74) Attorney, Agent, or Firm—Park, Vaughan & Fleming LLP

(57) ABSTRACT

A system that solves a global inequality constrained optimization problem specified by a function $f$ and a set of inequality constraints $p_i(x) \leq 0 (i=1, \ldots, m)$, wherein $f$ and $p_i$ are scalar functions of a vector $x=(x_1, x_2, x_3, \ldots x_n)$. The system performs an interval inequality constrained global optimization process to compute guaranteed bounds on a globally minimum value of the function $f(x)$ subject to the set of inequality constraints. The system applies term consistency and box consistency to a set of relations associated with the global inequality constrained optimization problem over a subbox X, and excludes any portion of the subbox X that violates the set of relations. The system also performs an interval Newton step on the subbox X to produce a resulting subbox Y. The system integrates the sub-parts of the process with branch tests designed to increase the overall speed of the process.

48 Claims, 8 Drawing Sheets

OTHER PUBLICATIONS

R. B. Kearfott, Algorithm 763: Interval Arithmetic: A Fortran 90 Module for an Interval Data Type, ACM Trans. Math. Software, 22, vol. 4, 1996, pp. 385-392. http://interval.louisiana.edu/preprints.html.

R. B. Kearfott and M. Novoa III, "Algorithm 681: INTBIS, A portable interval Newton/bisection package", ACM Trans. Math Software, vol. 16, No. 2, pp. 152-147. http://www.netlib.org/toms/681.

R. B. Kearfott, M. Dawande, K.S. Du, and C. Hu, "Algorithm 737: INTLIB: A Portable Fortran 737 Interval Standard Function Library," ACM Trans. Math. Software, 20, vol. 4, Dec. 1994, pp. 447-458.

R. B. Kearfott and G. W. Walster, "On Stopping Criteria in Verified Nonlinear Systems or Optimization Algorithms," ACM Trans. Math. Software, 26, vol. 3, Sep. 2000, pp. 323-351. The publication itself says Received: Jul. 1999; revised: Mar. 2000; accepted: Mar. 2000. http://interval.louisiana.edu/preprints.html.

R.E. Moore and S.T. Jones "Safe Starting Regions for Iterative Methods", SIAM Journal on Numerical Analysis, vol. 14, No. 6 (Dec. 1977), pp. 1051-1065.

A. Neumaier, "The Enclosure of Solutions of Parameter-Dependent Systems of Equations," Cambridge University Press, Cambridge, 1990, ISBN: 0-12-505630-3, Reliability in Computing pp. 269-286.

S.M. Rump, "Verification Methods for Dense and Sparse Systems of Equations," in Topics in Validated Computations: Proceedings of the IMACS-GAMM International Workshop on Validated Computations, University of Oldenburg, J. Herzberger, ed., Elsevier Studies in Computational Mathematics, Elsevier, 1994, pp. 63-136.

Publication: "Design, implementation and evaluation of the constraint language cc (FD)" by Pascal Van Hentenryck et al., The Journal of Logic Programming 37, 1998, pp. 139-164.

* cited by examiner $$X \equiv [\underline{x}, \bar{x}] \equiv \{x \in \Re^* | \underline{x} \leq x \leq \bar{x}\}$$

$$Y \equiv [\underline{y}, \bar{y}] \equiv \{y \in \Re^* | \underline{y} \leq y \leq \bar{y}\}$$

(1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X/Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})]$, if $0 \notin Y$ $X/Y \subseteq \Re^*$, if $0 \in Y$

FIG. 5

METHOD AND APPARATUS FOR SOLVING AN INEQUALITY CONSTRAINED GLOBAL OPTIMIZATION PROBLEM

RELATED APPLICATION

The subject matter of this application is related to the subject matter in a co-pending non-provisional application by the same inventors as the instant application entitled, "Applying Term Consistency to an Inequality Constrained Interval Global Optimization Problem," having Ser. No. 10/017,574, and filing date 13 Dec. 2001.

BACKGROUND

1. Field of the Invention

The present invention relates to performing arithmetic operations on interval operands within a computer system. More specifically, the present invention relates to a method and an apparatus for using a computer system to solve a global optimization problem including inequality constraints with interval arithmetic.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers.)

One commonly performed computational operation is to perform inequality constrained global optimization to find a global minimum of a nonlinear objective function $f(x)$, subject to nonlinear inequality constraints of the form $p_i(x) \leq 0 (i=1, \ldots, m)$. This can be accomplished using any members of a set of criteria to delete boxes, or parts of boxes that either fail to satisfy one or more inequality constraints, or cannot contain the global minimum $f^*$ given the inequality constraints are all satisfied. The set of criteria includes:

(1) the $f\_bar$-criterion, wherein if $f\_bar$ is the smallest upper bound so far computed on $f$ within the feasible region defined by the inequality constraints, then any point x for which $f(x) > f\_bar$ can be deleted. Similarly, any box X can be deleted if $inf(f(X)) > f\_bar$;

(2) the monotonicity criterion, wherein if g(x) is the gradient of $f$ evaluated at a feasible point x for which all $p_i(x) < 0 (i=1, \ldots, m)$, then any such feasible point x for which $g(x) \neq 0$ can be deleted. Similarly, any feasible box X can be deleted if $0 \notin g(X)$;

(3) the convexity criterion, wherein if $H_{ii}(x)$ is the i-th diagonal element of the Hessian of $f$, then any feasible point x for all which all $p_i(x) < 0 (i=1, \ldots, m)$ and $H_{ii}(x) < 0$ (for $i=1, \ldots, n$) can be deleted. Similarly, any box X in the interior of the feasible region can be deleted if $H_{ii}(X) < 0$ (for $i=1, \ldots, n$); and (4) the stationary point criterion, wherein points x are deleted using the interval Newton technique to solve the John conditions. (The John conditions are described in "Global Optimization Using Interval Analysis" by Eldon R. Hansen, Marcel Dekker, Inc., 1992.)

All of these criteria work best "in the small" when the objective function $f$ is approximately linear or quadratic and "active" constraints are approximately linear. An active constraint is one that is zero at a solution point. For large intervals containing multiple stationary points the above criteria might not succeed in deleting much of a given box. In this case the box is split into two or more sub-boxes, which are then processed independently. By this mechanism all the inequality constrained global minima of a nonlinear objective function can be found.

One problem is applying this procedure to large n-dimensional interval vectors (or boxes) that contain multiple local minima. In this case, the process of splitting in n-dimensions can lead to exponential growth in the number of boxes to process.

It is well known that this problem (and even the problem of computing "sharp" bounds on the range of a function of n-variables over an n-dimensional box) is an "NP-hard" problem. In general, NP-hard problems require an exponentially increasing amount of work to solve as n, the number of independent variables, increases.

Because NP-hardness is a worst-case property and because many practical engineering and scientific problems have relatively simple structure, one problem is to use this simple structure of real problems to improve the efficiency of interval inequality constrained global optimization algorithms.

Hence, what is needed is a method and an apparatus for using the structure of a nonlinear objective function to improve the efficiency of interval inequality constrained global optimization software. To this end, what is needed is a method and apparatus that efficiently deletes "large" boxes or parts of large boxes that the above criteria can only split.

SUMMARY

The present invention combines various methods to speed up the process of bounding all the inequality constrained global minima of a nonlinear function. The combined method uses the structure of the objective function and inequality constraints to efficiently delete parts or all of large boxes that would otherwise have to be split. One embodiment of the present invention provides a system that solves a global inequality constrained optimization problem specified by a function $f$ and a set of inequality constraints $p_i(X)<0(i=1, \ldots, m)$, wherein $f$ and $p_i$ are scalar functions of a vector $x=(x_1, x_2, x_3, \ldots x_n)$. During operation, the system receives a representation of the function $f$ and the set of inequality constraints, and stores the representation in a memory within the computer system. Next, the system performs an interval inequality constrained global optimization process to compute guaranteed bounds on a globally minimum value of the function $f(x)$ subject to the set of inequality constraints. During this process, the system applies term consistency to a set of relations associated with the global inequality constrained optimization problem over a subbox X, and excludes any portion of the subbox X that violates any set of these relations. The system also applies box consistency to the set of relations associated with the global inequality constrained optimization problem over the subbox X, and excludes any portion of the subbox X that violates any of the relations. The system also performs an interval Newton step for the global inequality constrained optimization problem over the subbox X to produce a resulting subbox Y, wherein the point of expansion of the interval Newton step is a point x.

For any function of n-variables $f(x)$ there are different ways to analytically express a component $x_j$ of the vector x. For example, one can write $f(x)=g(x_j)-h(x)$, where $g(x_j)$ is a term in $f$ for which it is possible to solve $g(x_j)=y$ for an element of x, $x_j$, using $g^{-1}(y)$. For each of these rearrangements, if a given interval box X is used as an argument of h, then the new interval $X_j^+$ for the j-th component of X, is guaranteed to be at least as narrow as the original, $X_j$.

$$X_j^+ = X_j \cap X'_j \text{ where } X'_j = g^{-1}(h(X)).$$

This process is then be iterated using different terms g of the function $f$. After reducing any element $X_j$ of the box X to $X_j^+$, the reduced value can be used in X thereafter to speed up the reduction process using other component functions if $f$ is a component of the vector function f.

Hereafter, the notation $g(x_j)$ for a term of the function $f(x)$ implicitly represents any term of any component function. This eliminates the need for additional subscripts that do not add clarity to the exposition.

In one embodiment of the present invention, while applying term consistency, the system symbolically manipulates an equation to solve for a term, $g(x'_j)$, thereby producing a modified equation $g(x'_j)=h(x)$, wherein the term $g(x'_j)$ can be analytically inverted to produce an inverse function $g^{-1}(y)$. Next, the system substitutes the subbox X into the modified equation to produce the equation $g(X'_j)=h(X)$. The system then solves for $X'_j=g^{-1}(h(X))$; and intersects $X'_j$ with the j-th element of the subbox X to produce a new subbox $X^+$. This new subbox $X^+$ contains all solutions of the equation within the subbox X. Furthermore the size of the new subbox $X^+$ is less than or equal to the size of the subbox X.

In a variation on this embodiment, applying term consistency to the set of relations involves applying term consistency to the set of inequality constraints $p_i(x) \leq 0 (i=1, \ldots, m)$ over the subbox X.

In a variation on this embodiment, applying box consistency to the set of relations involves applying box consistency to the set of inequality constraints $p_i(x) \leq 0 (i=1, \ldots, m)$ over the subbox X.

In a variation on this embodiment, during the interval inequality constrained global optimization process, the system keeps track of a least upper bound $f\_bar$ of the function $f(x)$ at a feasible point x, and removes from consideration any subbox X for which $f(X) > f\_bar$. In this variation, the system applies term consistency to the $f\_bar$ inequality $f(x) \leq f\_bar$ over the subbox X.

In a further variation, the system applies box consistency to the $f\_bar$ inequality $f(x) \leq f\_bar$ over the subbox X.

In a variation on this embodiment, if the subbox X is strictly feasible ($p_i(X)<0$ for all $i=1, \ldots, n$), the system determines a gradient g(x) of the function $f(x)$, wherein g(x) includes components $g_i(x)$ ($i=1, \ldots, n$). Next, the system removes from consideration any subbox for which g(x) is bounded away from zero, indicating that the subbox does not include an extremum of $f(x)$. In this variation, the system applies term consistency to each component $g_i(x)=0$ ($i=1, \ldots, n$) of g(x)=0 over the subbox X.

In a further variation, the system applies box consistency to each component $g_i(x)=0 (i=1, \ldots, n)$ of g(x)=0 over the subbox X.

In a variation on this embodiment, if the subbox X is strictly feasible ($p_i(X)<0$ for all $i=1, \ldots, n$), the system determines diagonal elements $H_{ii}(x)$ ($i=1, \ldots, n$) of the Hessian of the function $f(x)$. Next, the system removes from consideration any subbox X for which a diagonal element $H_{ii}(X)$ of the Hessian over the subbox X is always negative, indicating that the function $f$ is not convex over the subbox X and consequently does not contain a global minimum within the subbox X. In this variation, the system applies term consistency to each inequality $H_{ii}(x) \geq 0 (i=1, \ldots, n)$ over the subbox X.

In a further variation, the system applies box consistency to each inequality $H_{ii}(x) \geq 0 (i=1, \ldots, n)$ over the subbox X.

In a variation on this embodiment, if the subbox X is strictly feasible $p_i(X)<0$ for all $i=1, \ldots, n$), while performing the interval Newton step the system computes the Jacobian J(x,X) of the gradient of the function $f$ evaluated as a function of a point x over the subbox X. Next, the system computes an approximate inverse B of the center of J(x,X), and uses the approximate inverse B to analytically determine the system Bg(x), wherein g(x) is the gradient of the function $f(x)$, and wherein g(x) includes components $g_i(x)$ ($i=1, \ldots, n$).

In a further variation, the system applies term consistency to each component $(Bg(x))_i=0(i=1, \ldots, n)$ to solve for the variable $x_i$ over the subbox X.

In a further variation, the system applies box consistency to each component $(Bg(x))_i=0(i=1, \ldots, n)$ to solve for the variable $x_i$ over the subbox X.

In a variation on this embodiment, the system performs the interval Newton step on the John conditions.

In a variation on this embodiment, while performing the interval inequality constrained global optimization process, the system linearizes the set of inequality constraints to produce a set of linear inequality constraints with interval coefficients that enclose the nonlinear inequality constraints.

Next, the system preconditions the set of linear inequality constraints through additive linear combinations to produce a set of preconditioned linear inequality constraints. In this variation, the system applies term consistency to the set of preconditioned linearized inequality constraints over the subbox X.

In a further variation, the system applies box consistency to the set of preconditioned linearized inequality constraints over the subbox X.

BRIEF DESCRIPTION OF THE FIGURES

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
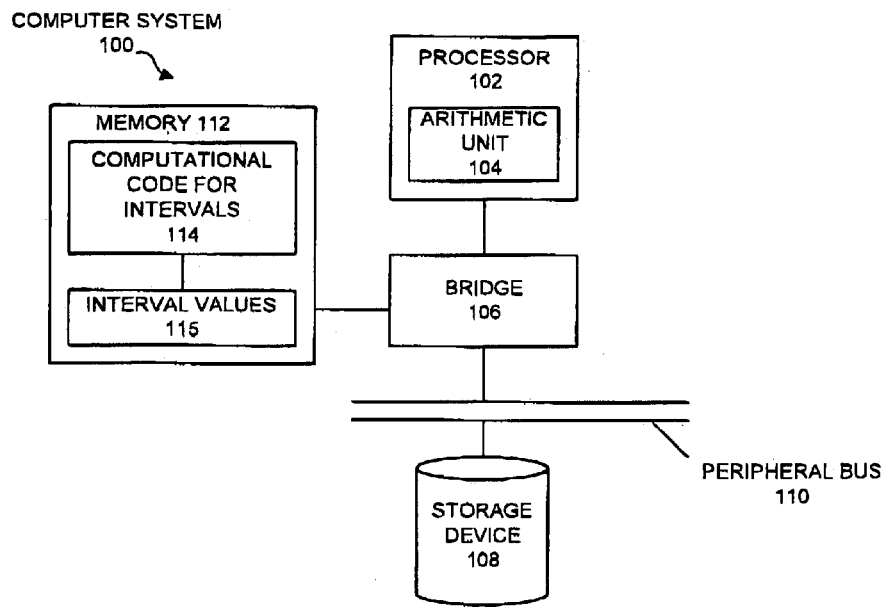
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
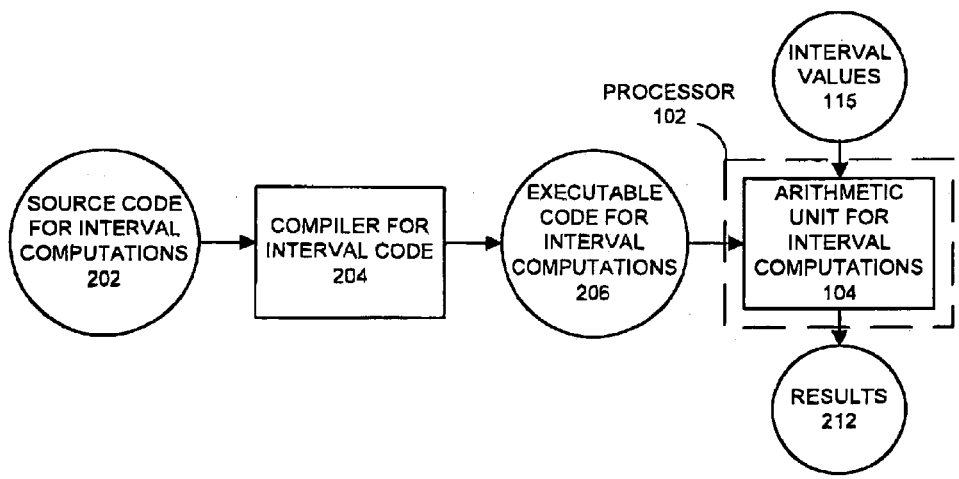
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
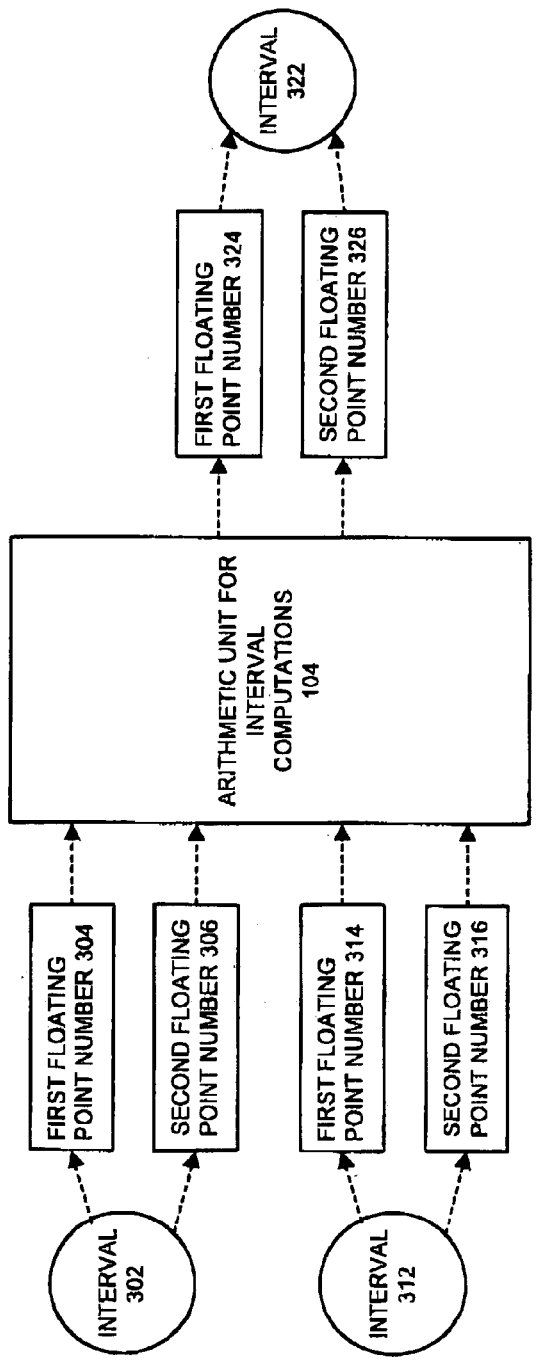
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
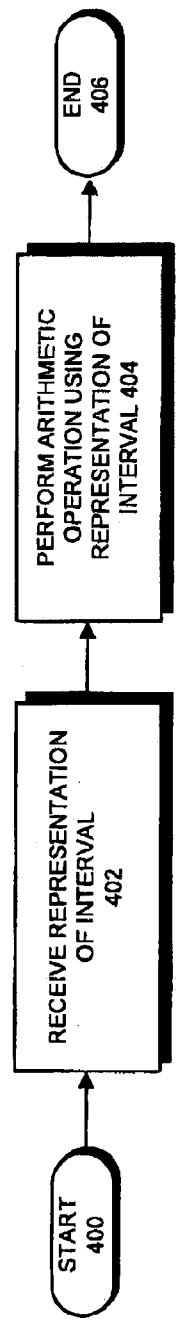
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed subset of the extended (including $-\infty$ and $+\infty$) real numbers R* (see line 1 of FIG. 5). Similarly the interval Y also has two endpoints and is a closed subset of the extended real numbers R* (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points negative infinity and positive infinity:

$$R^* = R \cup \{-\infty\} \cup \{+\infty\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Term Consistency

Figure 6:
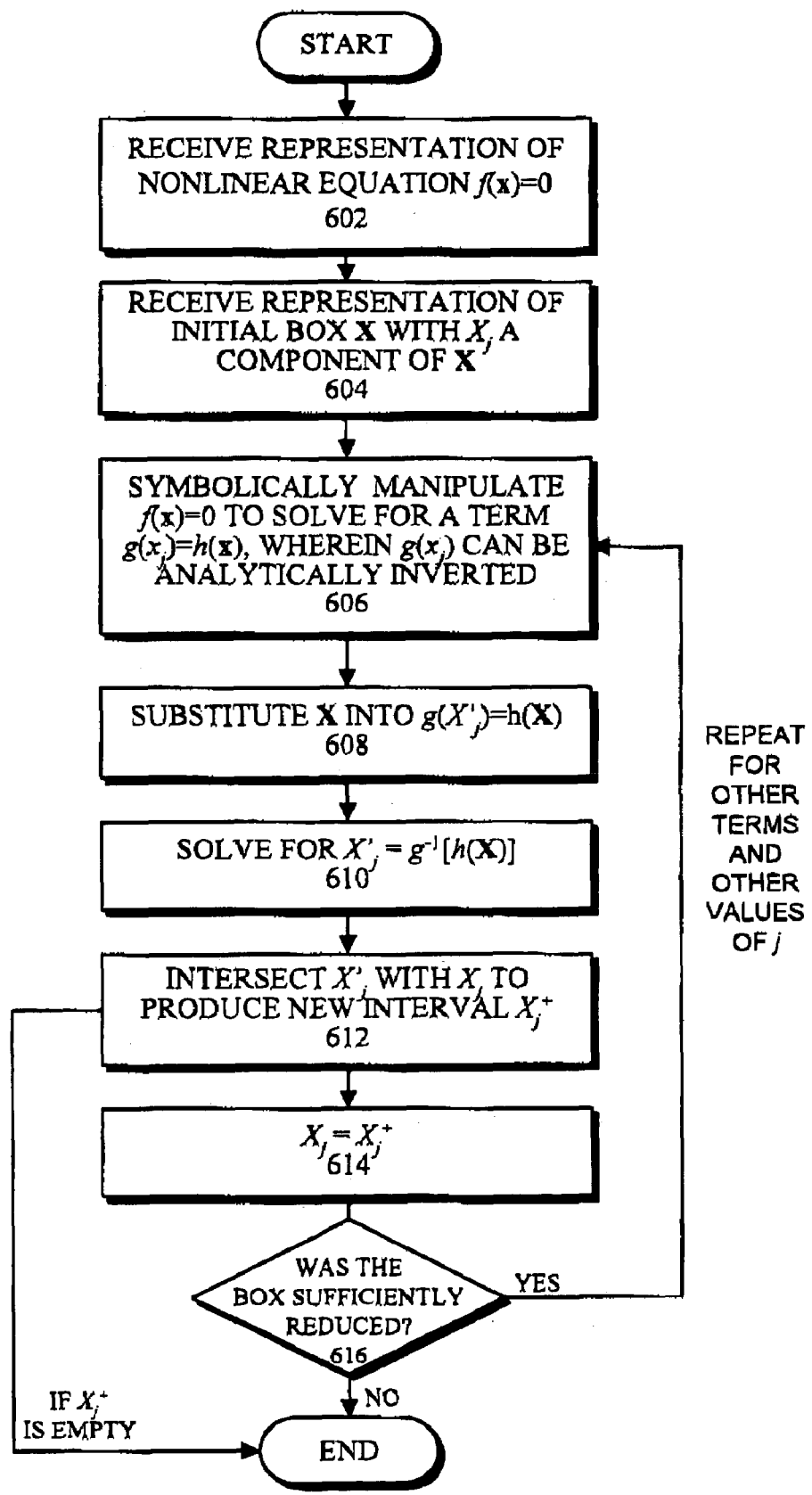
FIG. 6 is a flow chart illustrating the process of finding an interval solution to a nonlinear equation in accordance with an embodiment of the present invention.
Figure 7A:
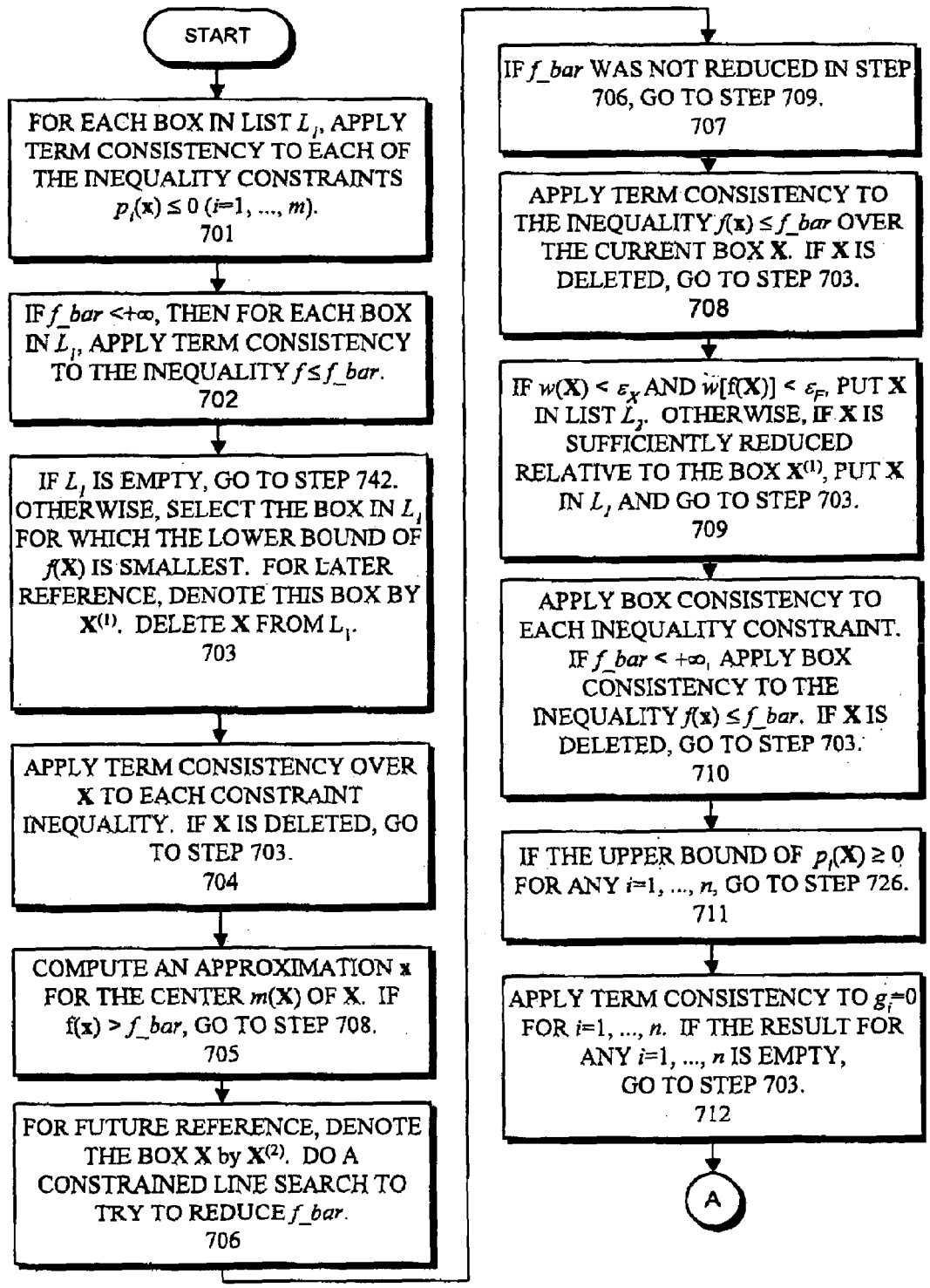
FIG. 7A presents a portion of a flow chart illustrating the process of using term consistency to solve an interval global optimization problem with inequality constraints in accordance with an embodiment of the present invention.
Figure 7B:
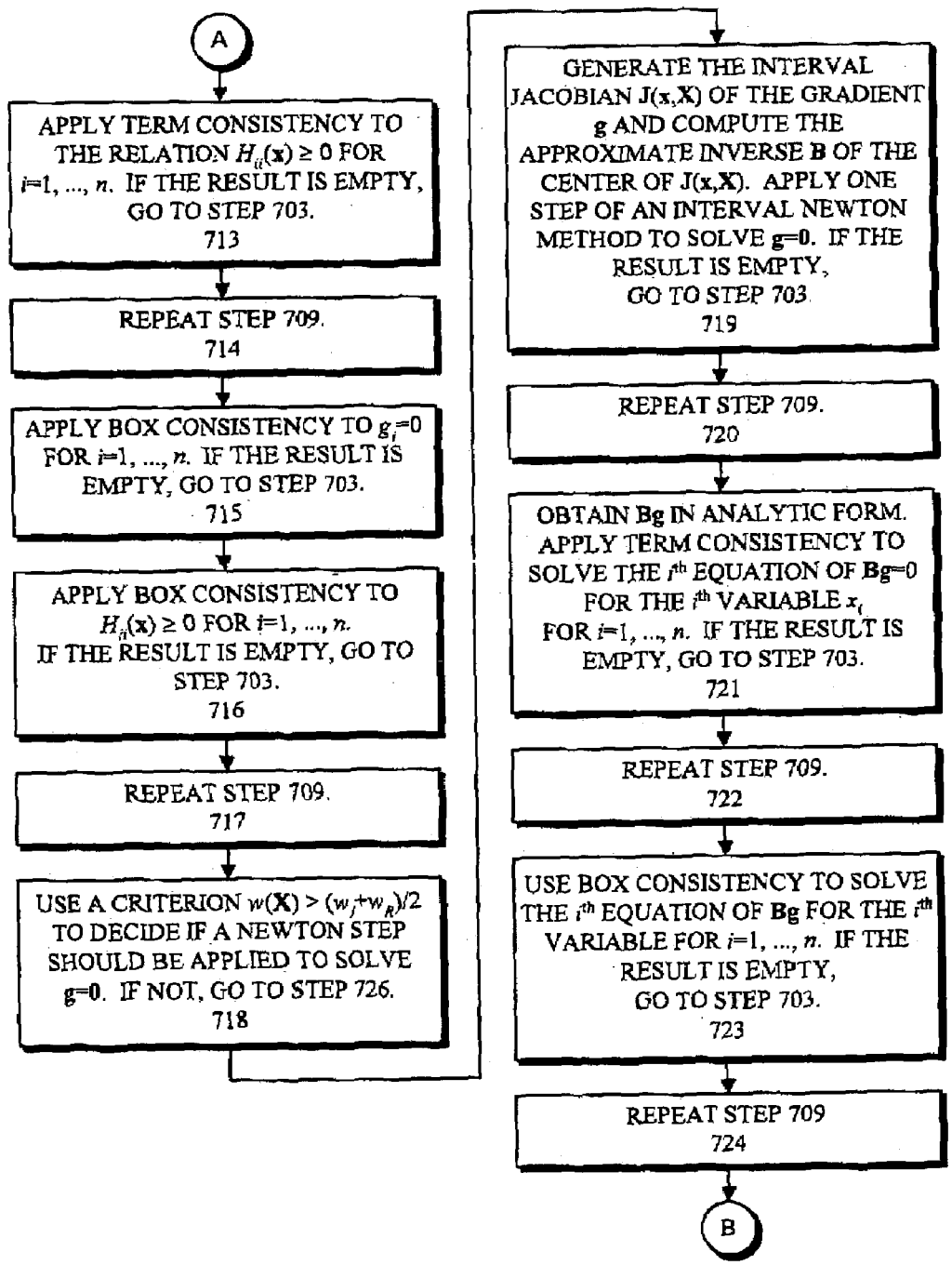
FIG. 7B presents a portion of a flow chart illustrating the process of using term consistency to solve an interval global optimization problem with inequality constraints in accordance with an embodiment of the present invention.
Figure 7C:
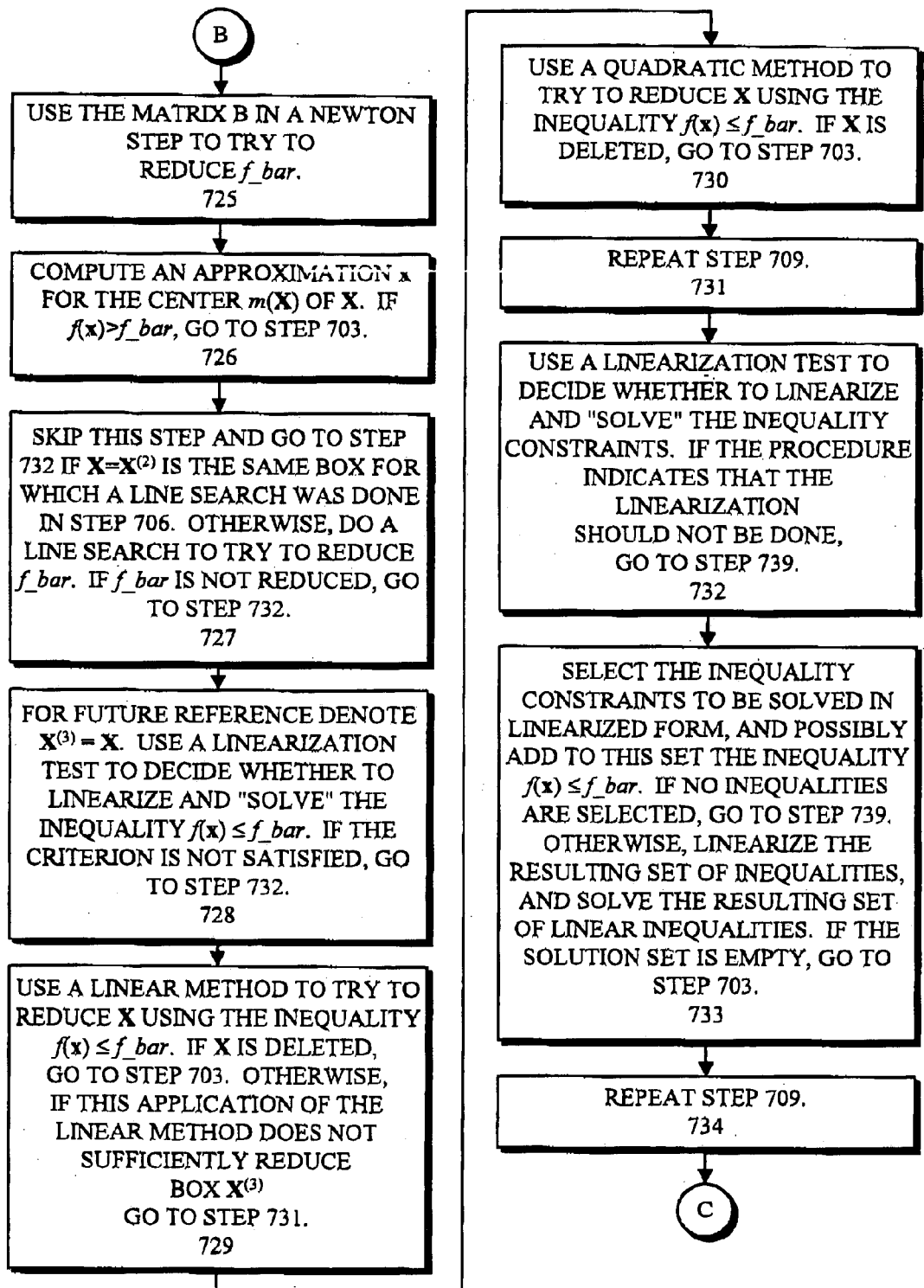
FIG. 7C presents a portion of a flow chart illustrating the process of using term consistency to solve an interval global optimization problem with inequality constraints in accordance with an embodiment of the present invention.
Figure 7D:
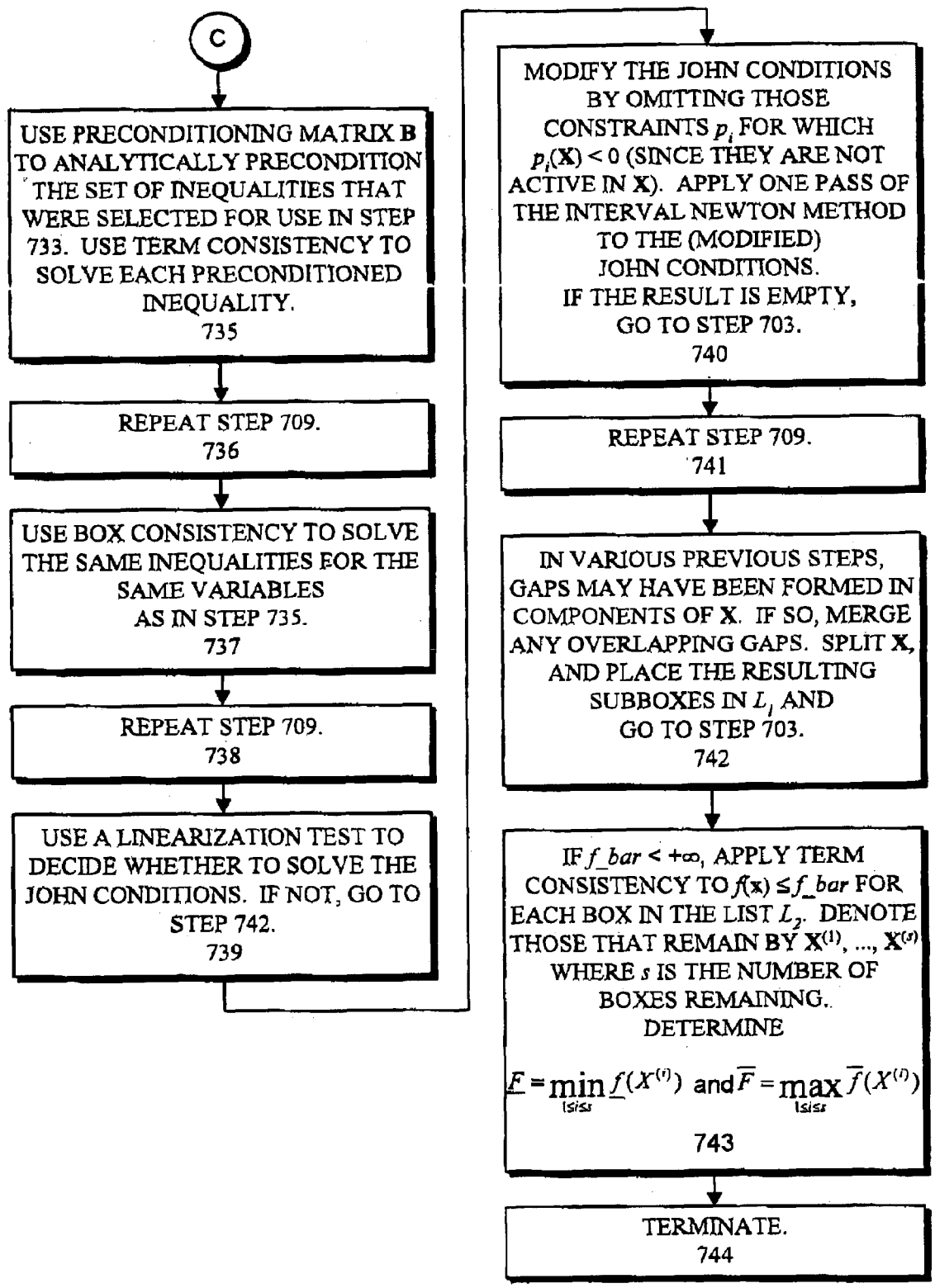
FIG. 7D presents a portion of a flow chart illustrating the process of using term consistency to solve an interval global optimization problem with inequality constraints in accordance with an embodiment of the present invention.

FIG. 6 is a flow chart illustrating the process of solving a nonlinear equation through interval arithmetic and term consistency in accordance with an embodiment of the present invention. The system starts by receiving a representation of a nonlinear equation $f(x)=0$ (step 602), as well as a representation of an initial box with X with $X_j$ an element of X (step 604). Next, the system symbolically manipulates the equation $f(x)=0$ into a form $g(x_j)-h(x)=0$, wherein the term $g(x_j)$ can be analytically inverted to produce an inverse function $g^{-1}(y)$ (step 606).

Next, the system substitutes the initial box X into h(X) to produce the equation $g(X'_j)=h(X)$ (step 608). The system then solves for $X'_j=g^{-1}(h(X))$ (step 610). The resulting interval $X'_j$ is then intersected with the initial interval $X_j$ to produce a new interval $X^{j+}$ (step 612).

At this point, if $X_j^-$ is empty, the system can terminate. Otherwise, the system can perform further processing. This further processing involves saving $X_j$ by setting $X^{(0)}=X_j$ and also, setting $X_j=X_j^+$ (step 614). Next, if $w(X^{(0)})$ is sufficiently reduced at step 616, the system returns to step 606 for another iteration of term consistency on another term g of $f(x)$. Otherwise, the system terminates.

Examples of Applying Term Consistency

For example, suppose $f(x)-x^2-x+6$. We can define $g(x)=x^2$ and $h(x)=x-6$. Let X=[−10,10]. The procedural step is $(X')^2=X-6=[-16,4]$. Since $(X')^2$ must be non-negative, we replace this interval by [0,4]. Solving for X', we obtain $X'=\pm[0,2]$. In replacing the range of h(x) (i.e., [−16,4]) by non-negative values, we have excluded that part of the range h(x) that is not in the domain of $g(x)=x^2$.

Suppose that we reverse the roles of g and h and use the iterative step $h(X')=g(X)$. That is $X'-6=X^2$. We obtain $X'=[6,106]$. Intersecting this result with the interval [−10,10], of interest, we obtain [6,10]. This interval excludes the set of values for which the range of g(X) is not in the intersection of the domain of h(X) with X.

Combining these results, we conclude that any solution of $f(X)=g(X)-h(X)=0$ that occurs in $X=[-10,10]$ must be in both $[-2,2]$ and $[6,10]$. Since these intervals are disjoint, there can be no solution in $[-10,10]$.

In practice, if we already reduced the interval from $[-10,10]$ to $[-2,2]$ by solving for g, we use the narrower interval as input when solving for h.

This example illustrates the fact that it can be advantageous to solve a given equation for more than one of its terms. The order in which terms are chosen affects the efficiency. Unfortunately, it is not known how best to choose the best order.

Also note that there can be many choices for g(x). For example, suppose we use term consistency to narrow the interval bound X on a solution of $f(x)=aX^4+bx+c=0$. We can let $g(x)=bx$ and compute $X'=-(aX^4+c)/b$ or we can let $g(x)=ax^4$ and compute $X'=\pm[-(bX+c)/a]^{1/4}$. We can also separate $x^4$ into $x^2 \ast x^2$ and solve for one of the factors $X'=\pm[-(bX+c)/(aX^2)]^{1/2}$.

In the multidimensional case, we may solve for a term involving more than one variable. We then have a two-stage process. For example, suppose we solve for the term $1/(x+y)$ from the function $f(x,y)=1/(x+y)-h(x,y)=0$. Let $x \in X=[1,2]$ and $y \in Y=[0.5,2]$. Suppose we find that $h(X,Y)=[0.5,1]$. Then $1/(x+y) \in [0.5,1]$ so $x+y \in [1,2]$. Now we replace y by $Y=[0.5,2]$ and obtain the bound $[-1,1.5]$ on X. Intersecting this interval with the given bound $X=[1,2]$ on x, we obtain the new bound $X'=[1,1.5]$.

We can use X' to get a new bound on h; but this may require extensive computing if h is a complicated function; so suppose we do not. Suppose that we do, however, use this bound on our intermediate result $x+y=[1,2]$. Solving for y as $[1,2]-X'$, we obtain the bound $[-0.5,1]$. Intersecting this interval with Y, we obtain the new bound $Y'=[0.5,1]$ on y. Thus, we improve the bounds on both x and y by solving for a single term of $f$.

The point of these examples is to show that term consistency can be used in many ways both alone and in combination with the interval Newton algorithm to improve the efficiency with which roots of a single nonlinear equation can be computed. The same is true for systems of nonlinear equations.

Inequality Constrained Interval Global Optimization

FIGS. 7A–7D collectively present a flow chart illustrating the process of solving an interval global optimization problem with inequality constraints in accordance with an embodiment of the present invention. Generally, we seek a solution in a single box specified by the user. However, any number of boxes can be initially specified.

The boxes can be disjoint or overlap. However, if they overlap, a minimum at a point that is common to more than one box is separately found as a solution in each box containing it. In this case, computing effort is wasted. If the user does not specify an initial box or boxes, we use a default box. The process finds the global minimum in the set of points formed by the set of boxes. We assume these initial boxes are placed in a list $L_1$ of boxes to be processed.

Suppose the user of the process knows a point x_bar that is guaranteed to be feasible. If so, we use this point to compute an initial upper bound $f$_bar on the global minimum $f^*$. If x_bar cannot be represented exactly on the computer, the system forms a representable interval vector X containing x_bar. We evaluate $f(X)$ and obtain [lower bound $f(X)$, upper bound $f(X)$]. Even if rounding and/or dependence are such that X cannot be numerically proven to be certainly feasible, we rely upon the user and assume that X contains a feasible point. Therefore, we set $f$_bar equal to the upper bound of $f(X)$.

Also the user may know an upper bound $f$_bar on $f^*$ even though he may not know where (or even if) $f$ takes on such a value in the feasible region defined by the inequality constraints. If so, we set $f$_bar equal to this known bound. If the known bound is not representable on the computer, the system rounds the value up to a larger value that is representable.

If no feasible point is known and no upper bound on $f^*$ is known, we set $f$_bar=+∞. The user must specify a box size tolerance $\epsilon_X$ and a function width tolerance $\epsilon_F$.

In the system, nonlinear functions are often linearized over a box X using Taylor expansion. However, use of linearization is generally ineffective if X is wide. Four different sub-procedures in the system use linearization. The system uses a "linearization test" to decide if a given sub-procedure should be used for a given box. Each of the four sub-procedures uses a separate test of the same kind. In each case, a criterion for "success" is defined. The symbol $w_R$ denotes the width of the largest box for which success was achieved. The symbol $w_I$ denotes the width of the smallest box for which success was not achieved. A given sub-procedure is applied for a box X whenever $w(X) \leq (w_R+w_I)/2$. For each sub-procedure, the system initially sets $w_R=0$ and $w_I=w(X^{(0)})$, where $X^{(0)}$ is the initial box. In addition, the system specifies a bound $f$_bar if one is known. Note that the four sub-procedures referred to above are: (1) Newton applied to the gradient; (2) Newton applied to the John conditions; (3) linearization of the constraints; and (4) linearization of $f(x) \leq f$_bar.

The steps of the process are performed in the order given except as indicated by branching.

First, for each box in the list $L_1$, the system applies term consistency to each of the inequality constraints $p_i(x) \leq 0$ (i=1, . . . , m) (step 701).

If $f$_bar<+∞, then for each box in $L_1$, the system applies term consistency to the inequality $f \leq f$_bar (step 702).

If $L_1$ is empty, the system goes to step 742. Otherwise, the system selects (for the next box X to be processed) the box in $L_1$ for which the lower bound of $f(X)$ is smallest. For later reference, the system denotes this box by $X^{(1)}$. The system also deletes X from $L_1$ (step 703).

The system applies term consistency over X to each constraint inequality. If X is deleted, the system goes to step 703. The system skips this step if X has not changed since step 701. (step 704).

Next, the system computes an approximation x for the center m(X) of X. If the upper bound of $f(x)>f$_bar, the system goes to step 708 (step 705).

For future reference, the system denotes the box X by $X^{(2)}$. Next, the system does a constrained line search to try to reduce $f$_bar (step 706).

If $f$_bar was not reduced in step 706, the system goes to step 709 (step 707).

Next, the system applies term consistency to the inequality $f(x) \leq f$_bar. If X is deleted, the system goes to step 703 (step 708).

If $w(X)<\epsilon_X$ and $w[f(X)]<\epsilon_F$, the system puts X in list $L_2$. Otherwise, if X is sufficiently reduced relative to the box $X^{(1)}$ defined in step 703, the system puts X in $L_1$ and goes to step 703 (step 709). We say that a box X is sufficiently reduced if any component of X is reduced by an amount that is at least a fraction (say 0.25) of the width of the widest component of X.

Next, the system applies box consistency to each inequality constraint. If $f\_bar<+\infty$, the system also applies box consistency to the inequality $f(x) \leq f\_bar$. If X is deleted, the system goes to step 703 (step 710).

If the upper bound of $p_i(X) \geq 0$ for any $i=1, \ldots, n$, (i.e., if X is not certainly strictly feasible), the system goes to step 726 (step 711).

Next, the system applies term consistency to $g_i(x)=0$ for $i=1, \ldots, n$, where g is the gradient of the objective function $f$. If the result for any $i=1, \ldots, n$ is empty, the system goes to step 703 (step 712). Note that the steps 712 through 725 do not use inequality constraints because none are active for the current box X.

Otherwise, the system applies term consistency to the relation $H_{ii}(x) \geq 0$ for $i=1, \ldots, n$, where $H_{ii}$ is a diagonal element of the Hessian of $f$. If the result is empty, the system goes to step 703 (step 713).

Next, the system repeats step 709 (step 714).

The system then applies box consistency to $g_i=0$ for $i=1, \ldots, n$. If the result is empty, the system goes to step 703 (step 715).

Next, the system applies box consistency to $H_{ii}(x) \geq 0$ for $i=1, \ldots, n$. If the result is empty, the system goes to step 703 (step 716).

Next, the system repeats step 709 (step 717).

The system then uses a criterion $w(X)>(W_I+W_R)/2$ to decide if a Newton step should be applied to solve $g=0$. If not, the system goes to step 726 (step 718). Note that, $w_I$ denotes the width of the smallest box for which $M^I=BJ(x,X)$ is irregular. If $M^I$ is regular for a given box, $w_R$ denotes the width of the largest box for which $M^I$ has been shown to be regular.

The system generates the interval Jacobian $J(x,X)$ of the gradient g and computes the approximate inverse B of the center of $J(x,X)$. The system also applies one step of an interval Newton method to solve $g=0$. If the result is empty, the system goes to step 703 (step 719).

Next, the system repeats step 709 (step 720).

The system then uses the matrix B found in step 719 to obtain Bg in analytic form. The system applies term consistency to solve the i-th equation of $Bg=0$ for the i-th variable x, for $i=1, \ldots, n$. If the result is empty, the system goes to step 703 (step 721).

Next, the system repeats step 709 (step 722).

The system uses box consistency to solve the i-th equation of Bg (as obtained in step 721) for the i-th variable for $i=1, \ldots, n$. If the result is empty, the system goes to step 703 (step 723).

Next, the system repeats step 709 (step 724).

The system uses the matrix B found in step 719 in a Newton Step to try to reduce the upper bound $f\_bar$ (step 725). A line search can be performed as follows. Suppose we evaluate the gradient $g(x)$ of $f(x)$ at a point x. Note that $f$ decreases (locally) in the negative gradient direction from x. A simple procedure for finding a point where $f$ is small is to search along this half-line. Let x be the center of the current box. Define the half-line of points $y(\alpha)=x-\alpha g(x)$ where $\alpha \geq 0$. We now use a standard procedure for finding an approximate minimum of the objective function $f$ on this half-line. We first restrict our region of search by determining the value $\alpha'$ such that $y(\alpha')=x-\alpha'g$ is on the boundary of the current box X, and search between x and x'. We use the following procedure. Each application of the procedure requires an evaluation of $f$. Procedure: If $f(x')<f(x)$, replace x by $(x+x')/2$. Otherwise, we replace x' by $(x+x')/2$.

Next, the system computes an approximation x for the center m(X) of X. If $f(x)>f\_bar$, the system goes to step 703 (step 726).

The system skips this step and goes to step 732 if $X=X^{(2)}$, the same box for which a line search was done in step 706. Otherwise, the system does a line search to try to reduce $f\_bar$. If $f\_bar$ is not reduced, the system goes to step 732 (step 727).

For future reference, the system denotes X by $X^{(3)}$. The system then uses a linearization test to decide whether to linearize and "solve" the inequality $f(x) \leq f\_bar$. If this condition is not satisfied, the system goes to step 732 (step 728).

The system uses a linear method to try to reduce X using the inequality $f(x) \leq f\_bar$. If X is deleted, the system goes to step 703. Otherwise, if this application of the linear method does not sufficiently reduce the box $X^{(3)}$, the system goes to step 731 (step 729).

The system uses a quadratic method to try to reduce X using the inequality $f(x) \leq f\_bar$. If X is deleted, the system goes to step 703 (step 730).

Next, the system repeats step 709 (step 731).

The system uses a criterion similar to that in step 718 to decide whether to linearize and "solve" the inequality constraints. If the procedure indicates that the linearization should not be done, the system goes to 739 (step 732).

Next, the system selects the inequality constraints to be solved in linearized form, and possibly adds to this set the inequality $f(x) \leq f\_bar$. Note that the selection process removes from consideration any inequality constraints that are not sufficiently violated. If no inequalities are selected, the system goes to step 739. Otherwise, the system linearizes the resulting set of inequalities, and solves the resulting set of linear inequalities. If the solution set is empty, the system goes to step 703 (step 733).

Next, the system repeats step 709 (step 734).

The system then uses the preconditioning matrix B formed at step 733 to analytically precondition the set of inequalities that were selected for use in step 733. The system also uses term consistency to solve each of the preconditioned inequalities. In so doing, each inequality is solved for the same (single) variable for which the linearized inequality was solved in step 733 (step 735).

Next, the system repeats step 709 (step 736).

The system uses box consistency to solve the same inequalities for the same variables as in step 735 (step 737).

Next, the system repeats step 709 (step 738).

The system uses a linearization test to decide whether to solve the John conditions. If not, the system goes to step 742 (step 739).

The system modifies the John conditions by omitting those constraints $p_i$ for which $p_i(X)<0$ (since they are not active in X). The system applies one pass of the interval Newton method to the (modified) John conditions. If the result is empty, the system goes to step 703 (step 740).

Next, the system repeats step 709 (step 741).

In various previous steps, gaps may have been generated in components of X. If so, the system merges any of these gaps that overlap. The system then splits X, and places the resulting subboxes in $L_1$ and goes to step 703 (step 742).

If $f\_bar<+\infty$, the system applies term consistency to $f(x) \leq f\_bar$ for each box in the list $L_2$. The system denotes those that remain by $X^{(1)}, \ldots, X^{(s)}$ where s is the number of boxes remaining. The system also determines $$\underline{F} = \min_{1 \le i \le s} \underline{f}(X^{(i)}) \text{ and } \overline{F} = \max_{1 \le i \le s} \overline{f}(X^{(i)}). \quad \text{(step 743)}$$

Finally, the system terminates (step 744).

After termination, $w(X) < \epsilon_X$ and $w(f(X)) < \epsilon_F$ for each remaining box X in the list $L_2$. Also, $$\underline{F} \le f(x) \le \overline{F}$$

for every point x in all remaining boxes. If, after termination, $f\_bar < +\infty$, we know there is a feasible point in the initial box(es). Therefore, we know that $$\underline{F} \le f^* \le \min\{\overline{f}, \overline{F}\}.$$

If, after termination, $f\_bar = +\infty$, then we have not found a certainly feasible point. There may or may not be one in $X^{(0)}$. However, we know that if a feasible point x does exist in $X^{(0)}$, then $$\underline{F} \le f(x) \le \overline{F}.$$

Suppose a feasible point exists. If our algorithm fails to find a certainly feasible point, then it does not produce an upper bound $f\_bar$ and cannot use the relation $f \le f\_bar$. In particular, it cannot delete local minima where $f(x) > f^*$. In this case, all local minima are contained in the set of output boxes.

If all of the initial box $X^{(0)}$ is deleted by our process, then we have proved that every point in $X^{(0)}$ is infeasible. Suppose that every point in $X^{(0)}$ is infeasible. Our process may prove this to be the case. However, we delete a subbox of $X^{(0)}$ only if it is certainly infeasible. Rounding errors and/or dependence may prevent us from proving certain infeasibility of an infeasible subbox. Increased wordlength can reduce rounding errors and decreasing $\epsilon_X$ can reduce the effect of dependence by causing subboxes to eventually become smaller. However, neither effect can completely be removed.

Suppose $f\_bar = +\infty$ after termination and $X^{(0)}$ has not been entirely eliminated. It may still be possible either to compute $f\_bar < \infty$ or to delete all of $X^{(0)}$ by reducing the values of $\epsilon_X$ and $\epsilon_F$ and continuing to apply the process. To try to do so, we need only to reduce these tolerances and move the boxes from list $L_2$ to list $L_1$. We can then restart the algorithm from the beginning with or without use of increased precision.

Note that steps 712 through 725 are essentially the same as corresponding steps in the process for unconstrained optimization. This is because these steps are applied to a box that is certainly feasible.

In our process, we avoid using more complicated procedures until the simpler ones no longer make sufficient progress in reducing the current box. For example, we delay use of the John conditions until all other procedures become unproductive.

We avoid using procedures that use Taylor expansions until we have evidence that expanded forms provide sufficiently accurate approximations to functions.

Inequality constraints are often simple relations of the form $x_i \le b_j$ or $x_j \ge \alpha_j$. Such constraints serve to determine the initial box $X^{(0)}$. Therefore, they are satisfied throughout $X^{(0)}$. Such constraints are omitted when applying any procedure designed to eliminate infeasible points. See steps 701, 704, 710 and 733.

In step 706 we use a line search to try to reduce $f\_bar$. This involves evaluating the gradient of $f$. We can avoid this evaluation by simply checking if the midpoint x of the box is feasible and, if so, using $f(x)$ as a candidate value for $f\_bar$. However, it helps to have a finite value off bar early, so the line search is worth doing when $f\_bar = +\infty$. Step 727 also uses a line search. It is less important here because a finite value of $f\_bar$ is likely to be computed in step 706. If there are a large number of constraints, then evaluating the gradient is not a dominant part of the work to do the line search.

Experience has shown that efficiency is enhanced if the subbox X to be processed is chosen to be the one for which $\inf(f(X))$ is smallest among all candidate subboxes. This tends to cause a smaller value of $f\_bar$ to be computed early in the algorithm. Therefore, we return to step 703 to choose a new subbox whenever the current box has substantially changed.

Suppose we find that $p_i(X) \le 0$ for some value of i and some box X. Then $p_i(X') \le 0$ for any $X' \subseteq X$. Therefore, we record the fact that $p_i(X) \le 0$ so that we need not evaluate $p_i(X')$ for any $X' \subseteq X$.

It is possible that the procedures in step 719, 721, 723 or 740 prove the existence of a solution to the optimization problem. If so, the user can be informed of this fact. Such a solution may be local or global.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. For example, although the present invention describes the use of derivatives in certain situations, it is often possible to use slopes instead of derivatives.

Additionally, the above disclosure is not intended to limit the present invention. The scope of the present invention is defined by the appended claims.

What is claimed is:

1. A method for using a computer system to solve a global inequality constrained optimization problem specified by a function and a set of inequality constraints $p_i(x) \le 0 (i=1, \ldots, m)$, wherein f and $p_i$ are scalar functions of a vector $x = (x_1, x_2, x_3 \ldots x_n)$, the method comprising: receiving a representation of the function/and the set of inequality constraints at the computer system; storing the representation in a memory within the computer system; performing an interval inequality constrained global optimization process to compute guaranteed bounds on a globally minimum value of the function f(x) subject to the set of inequality constraints; wherein performing the interval inequality constrained global optimization process involves, applying term consistency to a set of relations associated with the global inequality constrained optimization problem over a subbox X, and excluding any portion of the subbox X that violates any of these relations, applying box consistency to the set of relations associated with the global inequality constrained optimization problem over the subbox X, and excluding any portion of the subbox X that violates aiXy of these relations, and performing an interval Newton step for the global inequality constrained optimization problem over the subbox X to produce a resulting subbox Y, wherein the point of expansion of the interval Newton step is a point x: and recording the guaranteed bounds in the computer system memory; wherein applying term consistency involves: symbolically manipulating an equation within the computer system to solve for a term, $g(x'_j)$, thereby producing a modified equation $g(x'_j)=h(x)$ wherein the term $g(x'_j)$ is analytically inverted to produce an inverse function $g^{-1}(y)$, substituting the subbox X into the modified equation to produce the equation $g(X'_j)=h(X)$, solving for $X'_j=g^{-1}(h(X))$, and intersecting $X'_j$ with the j-th element of the subbox X to produce a new subbox $X^+$, wherein the new subbox $X^+$ contains all solutions of the equation within the subbox X, and wherein the size of the new subbox $X^+$ is less than or equal to the size of the subbox X.

2. The method of claim 1, wherein applying term consistency to the set of relations involves applying term consistency to the set of inequality constraints $p_i(x) \leq 0 (i=1, \ldots, m)$ over the subbox X.

3. The method of claim 1, wherein applying box consistency to the set of relations involves applying box consistency to the set of inequality constraints $p_i(x) \leq 0 (i=1, \ldots, m)$ over the subbox X.

4. The method of claim 1,
wherein performing the interval inequality constrained global optimization process involves,
keeping track of a smallest upper bound $f\_bar$ of the function $f(x)$ at a feasible point x,
removing from consideration any subbox X for which $f(X) > f\_bar$;
wherein applying term consistency to the set of relations involves applying term consistency to the $f\_bar$ inequality $f(x) \leq f\_bar$ over the subbox X.

5. The method of claim 4, wherein applying box consistency to the set of relations involves applying box consistency to the $f\_bar$ inequality $f(x) \leq f\_bar$ over the subbox X.

6. The method of claim 1, wherein if the subbox X is strictly feasible ($p_i(X) < 0$ for all $i=1, \ldots, n$), performing the interval inequality constrained global optimization process involves:
determining a gradient $g(x)$ of the function $f(x)$, wherein $g(x)$ includes components $g_i(x)$ ($i=1, \ldots, n$);
removing from consideration any subbox for which $g(x)$ is bounded away from zero, thereby indicating that the subbox does not include an extremum of $f(x)$; and
wherein applying term consistency to the set of relations involves applying term consistency to each component $g_i(x)=0 (i=1, \ldots, n)$ of $g(x)=0$ over the subbox X.

7. The method of claim 6, wherein applying box consistency to the set of relations involves applying box consistency to each component $g_i(x)=0 (i=1, \ldots, n)$ of $g(x)=0$ over the subbox X.

8. The method of claim 1, wherein if the subbox X is strictly feasible ($p_i(X) < 0$ for all $i=1, \ldots, n$), performing the interval inequality constrained global optimization process involves:
determining diagonal elements $H_{ii}(x)$ ($i=1, \ldots, n$) of the Hessian of the function $f(x)$;
removing from consideration any subbox for which a diagonal element $H_{ii}(X)$ of the Hessian over the subbox X is always negative, indicating that the function f is not convex over the subbox X and consequently does not contain a global minimum within the subbox X; and
wherein applying term consistency to the set of relations involves applying term consistency to each inequality $H_{ii}(x) \geq 0 (i=1, \ldots, n)$ over the subbox X.

9. The method of claim 8, wherein applying box consistency to the set of relations involves applying box consistency to each inequality $H_{ii}(x) \geq 0 (i=1, \ldots, n)$ over the subbox X.

10. The method of claim 1, wherein if the subbox X is strictly feasible ($p_i(X) < 0$ for all $i=1, \ldots, n$), performing the interval Newton step involves:
computing the Jacobian $J(x,X)$ of the gradient of the function $f$ evaluated with respect to a point x over the subbox X; and
computing an approximate inverse B of the center of $J(x,X)$, using the approximate inverse B to analytically determine the system $Bg(x)$, wherein $g(x)$ is the gradient of the function $f(x)$, and wherein $g(x)$ includes components $g_i(x)$ ($i=1, \ldots, n$).

11. The method of claim 10, wherein applying term consistency to the set of relations involves applying term consistency to each component $(Bg(x))_i=0 (i=1, \ldots, n)$ to solve for the variable $x_i$ over the subbox X.

12. The method of claim 10, wherein applying box consistency to the set of relations involves applying box consistency to each component $(Bg(x))_i=0 (i=1, \ldots, n)$ to solve for the variable $x_i$ over the subbox X.

13. The method of claim 1, wherein performing the interval Newton step involves performing the Newton step on the John conditions.

14. The method of claim 1,
wherein performing the interval inequality constrained global optimization process involves,
linearizing the set of inequality constraints to produce a set of linear inequality constraints with interval coefficients that enclose the nonlinear inequality constraints, and
preconditioning the set of linear inequality constraints through additive linear combinations to produce a set of preconditioned linear inequality constraints; and
wherein applying term consistency to the set of relations involves applying term consistency to the set of preconditioned linear inequality constraints over the subbox X.

15. The method of claim 14, wherein applying box consistency to the set of relations involves applying box consistency to the set of preconditioned linear inequality constraints over the subbox X.

16. The method of claim 1, wherein performing the interval Newton step involves:
computing $J(x,X)$, wherein $J(x,X)$ is the Jacobian of the function f evaluated as a function of x over the subbox X; and
determining if $J(x,X)$ is regular as a byproduct of solving for the subbox Y that contains values of y that satisfy $M(x,X)(y-x)=r(x)$, where $M(x,X)=BJ(x,X)$, $r(x)=-Bf(x)$, and B is an approximate inverse of the center of $J(x,X)$.

17. A computer-readable storage medium storing instructions that when executed by a computer cause the computer to perform a method for using a computer system to solve a global inequality constrained optimization problem specified by a function $f$ and a set of inequality constraints $p_i(x) \leq 0 (i=1, \ldots, m)$, wherein f and $p_i$ are scalar functions of a vector $x=(x_1, x_2, x_3 \ldots x_n)$, the method comprising: receiving a representation of the function $f$ and the set of inequality constraints at the computer system; storing the representation in a memory within the computer system; performing an interval inequality constrained global optimization process to compute guaranteed bounds on a globally minimum value of the function $f(x)$ subject to the set of inequality constraints; wherein performing the interval inequality constrained global optimization process involves, applying term consistency to a set of relations associated with the global inequality constrained optimization problem over a subbox X, and excluding any portion of the subbox X that violates any of these relations, applying box consistency to the set of relations associated with the global inequality constrained optimization problem over the subbox X, and excluding any portion of the subbox X that violates any of these relations, and performing an interval Newton step for the global inequality constrained optimization problem over the subbox X to produce a resulting subbox Y, wherein the point of expansion of the interval Newton step is a point x: and recording the guaranteed bounds in the computer system memory; wherein applying term consistency involves: symbolically manipulating an equation within the computer system to solve for a term, $g(x'_j)$, thereby producing a modified equation $g(x'_j)=h(x)$ wherein the term $g(x'_j)$ is analytically inverted to produce an inverse function $g^{-1}(y)$, substituting the subbox X into the modified equation to produce the equation $g(X'_j)=h(X)$, solving for $X'_j=g^{-1}(h(X))$, and intersecting $X'_j$ with the j-th element of the subbox X to produce a new subbox $X^+$, wherein the new subbox $X^+$ contains all solutions of the equation within the subbox X, and wherein the size of the new subbox $X^+$ is less than or equal to the size of the subbox X.

18. The computer-readable storage medium of claim 17, wherein applying term consistency to the set of relations involves applying term consistency to the set of inequality constraints $p_i(x) \leq 0 (i=1, \ldots, m)$ over the subbox X.

19. The computer-readable storage medium of claim 17, wherein applying box consistency to the set of relations involves applying box consistency to the set of inequality constraints $p_i(x) \leq 0 (i=1, \ldots, m)$ over the subbox X.

20. The computer-readable storage medium of claim 17,
wherein performing the interval inequality constrained global optimization process involves,
keeping track of a smallest upper bound $f\_bar$ of the function $f(x)$ at a feasible point x,
removing from consideration any subbox X for which $f(X) > f\_bar$;
wherein applying term consistency to the set of relations involves applying term consistency to the $f\_bar$ inequality $f(x) \leq f\_bar$ over the subbox X.

21. The computer-readable storage medium of claim 20, wherein applying box consistency to the set of relations involves applying box consistency to the $f\_bar$ inequality $f(x) \leq f\_bar$ over the subbox X.

22. The computer-readable storage medium of claim 21, wherein if the subbox X is strictly feasible ($p_i(X)<0$ for all $i=1, \ldots, n$), performing the interval inequality constrained global optimization process involves:
determining a gradient $g(x)$ of the function $f(x)$, wherein $g(x)$ includes components $g_i(x)$ $(i=1, \ldots, n)$;
removing from consideration any subbox for which $g(x)$ is bounded away from zero, thereby indicating that the subbox does not include an extremum of $f(x)$; and
wherein applying term consistency to the set of relations involves applying term consistency to each component $g_i(x)=0(i=1, \ldots, n)$ of $g(x)=0$ over the subbox X.

23. The computer-readable storage medium of claim 22, wherein applying box consistency to the set of relations involves applying box consistency to each component $g_i(x)=0(i=1, \ldots, n)$ of $g(x)=0$ over the subbox X.

24. The computer-readable storage medium of claim 17, wherein if the subbox X is strictly feasible $p_i(X)<0$ for all $i=1, \ldots, n$), performing the interval inequality constrained global optimization process involves:
determining diagonal elements $H_{ii}(x)$ $(i=1, \ldots, n)$ of the Hessian of the function $f(x)$;
removing from consideration any subbox for which a diagonal element $H_{ii}(X)$ of the Hessian over the subbox X is always negative, indicating that the function $f$ is not convex over the subbox X and consequently does not contain a global minimum within the subbox X; and
wherein applying term consistency to the set of relations involves applying term consistency to each inequality $H_{ii}(x) \geq 0(i=1, \ldots, n)$ over the subbox X.

25. The computer-readable storage medium of claim 24, wherein applying box consistency to the set of relations involves applying box consistency to each inequality $H_{ii}(x) \geq 0(i=1, \ldots, n)$ over the subbox X.

26. The computer-readable storage medium of claim 17, wherein if the subbox X is strictly feasible ($p_i(X)<0$ for all $i=1, \ldots, n$), performing the interval Newton step involves:
computing the Jacobian $J(x,X)$ of the gradient of the function $f$ evaluated with respect to a point x over the subbox X; and
computing an approximate inverse B of the center of $J(x,X)$, using the approximate inverse B to analytically determine the system $Bg(x)$, wherein $g(x)$ is the gradient of the function $f(x)$, and wherein $g(x)$ includes components $g_i(x)$ $(i=1, \ldots, n)$.

27. The computer-readable storage medium of claim 26, wherein applying term consistency to the set of relations involves applying term consistency to each component $(Bg(x))_i=0(i=1, \ldots, n)$ to solve for the variable $x_i$ over the subbox X.

28. The computer-readable storage medium of claim 26, wherein applying box consistency to the set of relations involves applying box consistency to each component $(Bg(x))_i=0(i=1, \ldots, n)$ to solve for the variable $x_i$ over the subbox X.

29. The computer-readable storage medium of claim 17, wherein performing the interval Newton step involves performing the interval Newton step on the John conditions.

30. The computer-readable storage medium of claim 17,
wherein performing the interval inequality constrained global optimization process involves,
linearizing the set of inequality constraints to produce a set of linear inequality constraints with interval coefficients that enclose the nonlinear inequality constraints, and
preconditioning the set of linear inequality constraints through additive linear combinations to produce a set of preconditioned linear inequality constraints; and
wherein applying term consistency to the set of relations involves applying term consistency to the set of preconditioned linear inequality constraints over the subbox X.

31. The computer-readable storage medium of claim 30, wherein applying box consistency to the set of relations involves applying box consistency to the set of preconditioned linear inequality constraints over the subbox X.

32. The computer-readable storage medium of claim 17, wherein performing the interval Newton step involves:
computing $J(x,X)$, wherein $J(x,X)$ is the Jacobian of the function f evaluated as a function of x over the subbox X; and
determining if $J(x,X)$ is regular as a byproduct of solving for the subbox Y that contains values of y that satisfy $M(x,X)(y-x)=r(x)$, where $M(x,X)=BJ(x,X)$, $r(x)=-Bf(x)$, and B is an approximate inverse of the center of $J(x,X)$.

33. An apparatus that solves a global inequality constrained optimization problem specified by a function f and a set of inequality constraints $p_i(x) \leq 0(i=1, \ldots, m)$, wherein f and $p_i$ are scalar functions of a vector $x=(x_1, x_2, x_3 \ldots x_n)$, the apparatus comprising: a receiving mechanism that is configured to receive a representation of the function $f$ and the set of inequality constraints at the computer system; a memory for storing the representation, an interval global optimization mechanism that is configured to perform an interval inequality constrained global optimization process to compute guaranteed bounds on a globally minimum value of the function f(x) subject to the set of inequality constraints; a term consistency mechanism within the interval global optimization mechanism that is configured to apply term consistency to a set of relations associated with the global inequality constrained optimization problem over a subbox X, and to exclude any portion of the subbox X that violates any of these relations, a box consistency mechanism within the interval global optimization mechanism that is configured to apply box consistency to the set of relations associated with the global inequality constrained optimization problem over the subbox X, and to exclude any portion of the subbox X that violates any of these relations, and an interval Newton mechanism within the interval global optimization mechanism that is configured to perform an interval Newton step for the global inequality constrained optimization problem over the subbox X to produce a resulting subbox Y, wherein the point of expansion of the interval Newton step is a point x: and a recording mechanism that is configured to record the guaranteed bounds in the computer system memory: wherein the term consistency mechanism is configured to: symbolically manipulating an equation within the computer system to solve for a term, $g(x'_j)$, thereby producing a modified equation $g(x'_j)=h(x)$ wherein the term $g(x'_j)$ is analytically inverted to produce an inverse function $g^{-1}(y)$, substituting the subbox X into the modified equation to produce the equation $g(X'_j)=h(X)$, solving for $X'_j=g^{-1}(h(X))$, and intersecting $X'_j$ with the j-th element of the subbox X to produce a new subbox $X^+$, wherein the new subbox $X^+$ contains all solutions of the equation within the subbox X, and wherein the size of the new subbox $X^+$ is less than or equal to the size of the subbox X.

34. The apparatus of claim 33, wherein the term consistency mechanism is configured to apply term consistency to the set of inequality constraints $p_i(x) \leq 0 (i=1, \ldots, m)$ over the subbox X.

35. The apparatus of claim 33, wherein the box consistency mechanism is configured to apply box consistency to the set of inequality constraints $p_i(x) \leq 0 (i=1, \ldots, m)$ over the subbox X.

36. The apparatus of claim 33,
wherein the interval global optimization mechanism is configured to,
keep track of a smallest upper bound $f\_bar$ of the function $f(x)$ at a feasible point x, and to
remove from consideration any subbox X for which $f(X) > f\_bar$;
wherein the term consistency mechanism is configured to apply term consistency to the $f\_bar$ inequality $f(x) \leq f\_bar$ over the subbox X.

37. The apparatus of claim 36, wherein the box consistency mechanism is configured to apply box consistency to the $f\_bar$ inequality $f(x) \leq f\_bar$ over the subbox X.

38. The apparatus of claim 33, wherein if the subbox X is strictly feasible ($p_i(X)<0$ for all $i=1, \ldots, n$), the interval global optimization mechanism is configured to:
determine a gradient g(x) of the function $f(x)$, wherein g(x) includes components $g_i(x)$ ($i=1, \ldots, n$);
remove from consideration any subbox for which g(x) is bounded away from zero, thereby indicating that the subbox does not include an extremum of $f(x)$; and
the term consistency mechanism is configured to apply term consistency to each component $g_i(x)=0 (i=1, \ldots, n)$ of $g(x)=0$ over the subbox X.

39. The apparatus of claim 38, wherein the box consistency mechanism is configured to apply box consistency to each component $g_i(x)=0 (i=1, \ldots, n)$ of $g(x)=0$ over the subbox X.

40. The apparatus of claim 33, wherein if the subbox X is strictly feasible ($p_i(X)<0$ for all $i=1, \ldots, n$), the interval global optimization mechanism is configured to:
determine diagonal elements $H_{ii}(x)$ ($i=1, \ldots, n$) of the Hessian of the function $f(x)$;
remove from consideration any subbox for which a diagonal element $H_{ii}(X)$ of the Hessian over the subbox X is always negative, indicating that the function $f$ is not convex over the subbox X and consequently does not contain a global minimum within the subbox X; and
the term consistency mechanism is configured to apply term consistency to each inequality $H_{ii}(x) \geq 0 (i=1, \ldots, n)$ over the subbox X.

41. The apparatus of claim 40, wherein the box consistency mechanism is configured to apply box consistency to each inequality $H_{ii}(x) \geq 0 (i=1, \ldots, n)$ over the subbox X.

42. The apparatus of claim 33, wherein if the subbox X is strictly feasible ($p_i(X)<0$ for all $i=1, \ldots, n$), the interval global optimization mechanism is configured to perform the interval Newton step by:
computing the Jacobian J(x,X) of the gradient of the function $f$ evaluated with respect to a point x over the subbox X; and
computing an approximate inverse B of the center of J(x,X),
using the approximate inverse B to analytically determine the system Bg(x), wherein g(x) is the gradient of the function $f(x)$, and wherein g(x) includes components $g_i(x)$ ($i=1, \ldots, n$).

43. The apparatus of claim 42, the term consistency mechanism is configured to apply term consistency to each component $(Bg(x))_i=0 (i=1, \ldots, n)$ to solve for the variable $x_i$ over the subbox X.

44. The apparatus of claim 42, the box consistency mechanism is configured to apply box consistency to each component $(Bg(x))_i=0 (i=1, \ldots, n)$ to solve for the variable $x_i$ over the subbox X.

45. The apparatus of claim 33, wherein the interval Newton mechanism is configured to perform the Newton step on the John conditions.

46. The apparatus of claim 33,
wherein the interval global optimization mechanism is configured to:
linearize the set of inequality constraints to produce a set of linear inequality constraints with interval coefficients that enclose the nonlinear inequality constraints, and to
precondition the set of linear inequality constraints through additive linear combinations to produce a set of preconditioned linear inequality constraints; and
wherein the term consistency mechanism is configured to apply term consistency to the set of preconditioned linear inequality constraints over the subbox X.

47. The apparatus of claim 46, wherein the box consistency mechanism is configured to apply box consistency to the set of preconditioned linear inequality constraints over the subbox X.

48. The apparatus of claim 33, wherein the interval Newton mechanism is configured to:
compute $J(x,X)$, wherein $J(x,X)$ is the Jacobian of the function f evaluated as a function of x over the subbox X; and to
determine if $J(x,X)$ is regular as a byproduct of solving for the subbox Y that contains values of y that satisfy $M(x,X)(y-x)=r(x)$, where $M(x,X)=BJ(x,X)$, $r(x)=-Bf(x)$, and B is an approximate inverse of the center of $J(x,X)$.

* * * * *

UNITED STATES PATENT AND TRADEMARK OFFICE
CERTIFICATE OF CORRECTION

PATENT NO. : 7,062,524 B2 Page 1 of 1
APPLICATION NO. : 10/042883
DATED : June 13, 2006
INVENTOR(S) : G. William Walster et al.

It is certified that error appears in the above-identified patent and that said Letters Patent is hereby corrected as shown below:

In claim 1 (at column 14, line 60), please delete the word, "aiXy" and replace with the word --any--.

In claim 44 (at column 20, line 48), please delete the variable, "x," and replace with the variable --$x_i$--.

Signed and Sealed this

Twelfth Day of September, 2006

JON W. DUDAS
*Director of the United States Patent and Trademark Office*